| (12) | United States Patent<br>Oldenettel et al. | (10) Patent No.: US 9,102,208 B2<br>(45) Date of Patent: Aug. 11, 2015 |
|---|---|---|

(54) AIR SUSPENSION SYSTEM WITH LOAD DETECTION

(71) Applicant: Continental Automotive Systems, Inc., Auburn Hills, MI (US)

(72) Inventors: Holger Oldenettel, Wedenmark (DE); Harald Schaumburg, Sarstedt (DE); Volker Ihlein, Rochester Hills, MI (US); Heidi Quinn-Buss, Swartz Creek, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 96 days.

(21) Appl. No.: 13/919,588

(22) Filed: Jun. 17, 2013

(65) Prior Publication Data

US 2013/0338876 A1 Dec. 19, 2013

Related U.S. Application Data

(60) Provisional application No. 61/660,247, filed on Jun. 15, 2012.

(51) Int. Cl.
*B60G 17/015* (2006.01)

(52) U.S. Cl.
CPC ........ *B60G 17/0155* (2013.01); *B60G 2300/38* (2013.01); *B60G 2400/25* (2013.01); *B60G 2800/203* (2013.01); *B60G 2800/204* (2013.01); *B60W 2300/121* (2013.01)

(58) Field of Classification Search
CPC .................... B60G 2400/252; B60G 2800/20; B60G 2800/202; B60G 2800/203; B60G 2800/204; B60G 2800/2042; B60W 10/22; B60W 2300/12; B60W 2300/121; B60W 2300/123; B60W 2300/125; B60W 2300/48; B60W 2510/22; B60W 2710/22; B60W 40/13
USPC .............................................. 701/37, 50, 116
See application file for complete search history.

(56) References Cited

U.S. PATENT DOCUMENTS

| 6,061,615 | A * | 5/2000 | Karthaeuser | .................... | 701/37 |
| 7,316,406 | B2 * | 1/2008 | Kimura et al. | ............. | 280/6.157 |
| 8,801,000 | B1 * | 8/2014 | Power | ........................ | 280/6.151 |

* cited by examiner

*Primary Examiner* — Jerrah Edwards

(57) ABSTRACT

A method of controlling a suspension system for a vehicle which comprises determining a first filter vehicle height based upon a signal from at least one sensor located at a rear axle of the vehicle at a first time. A second filter vehicle height is determined based upon a signal from the at least one sensor located at the rear axle of the vehicle at a second time. The difference between the first filter signal and the second filter signal is compared to a forklift threshold and the suspension system is placed in forklift mode when the difference between the first filter signal and the second filter signal exceeds the forklift threshold.

14 Claims, 4 Drawing Sheets

AIR SUSPENSION SYSTEM WITH LOAD DETECTION

PRIORITY

This application is a non-provisional of, and claims priority to the Jun. 15, 2012, filing date of, U.S. provisional patent application Ser. No. 61/660,247, the entire content of which is incorporated herein by reference.

TECHNICAL FIELD

The present disclosure relates to vehicles and more particularly to adjustable suspension systems for automotive vehicles.

BACKGROUND

Vehicles equipped with air suspension systems are adjustable to maintain a target vehicle height regardless of vehicle load. When load is added or removed from the vehicle the suspension system detects the change in vehicle height. Based upon the detected change in height the suspension system adjusts the amount of compressed air within the air springs accordingly. Therefore, during instances of increased vehicle load compressed air is conveyed to the air springs. Thus, making the vehicle return at the targeted vehicle level.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a suspension system for a vehicle which comprises determining a first filter vehicle height based upon a signal from at least one sensor located at a rear axle of the vehicle at a first time. A second filter vehicle height is determined based upon a signal from the at least one sensor located at the rear axle of the vehicle at a second time. The difference between the first filter signal and the second filter signal is compared to a forklift threshold and the suspension system is placed in forklift mode when the difference between the first filter signal and the second filter signal exceeds the forklift threshold.

A suspension system for a vehicle comprises an electronic control unit to control height leveling for the suspension system. At least one sensor is located at a rear axle of the vehicle to determine vehicle height. The suspension system is placed in a forklift mode when the electronic control unit determines that a forklift threshold has been exceed based upon a comparison between a first height measurement from the sensor collected at a first time and a second height measurement form the sensor collected at a second time.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
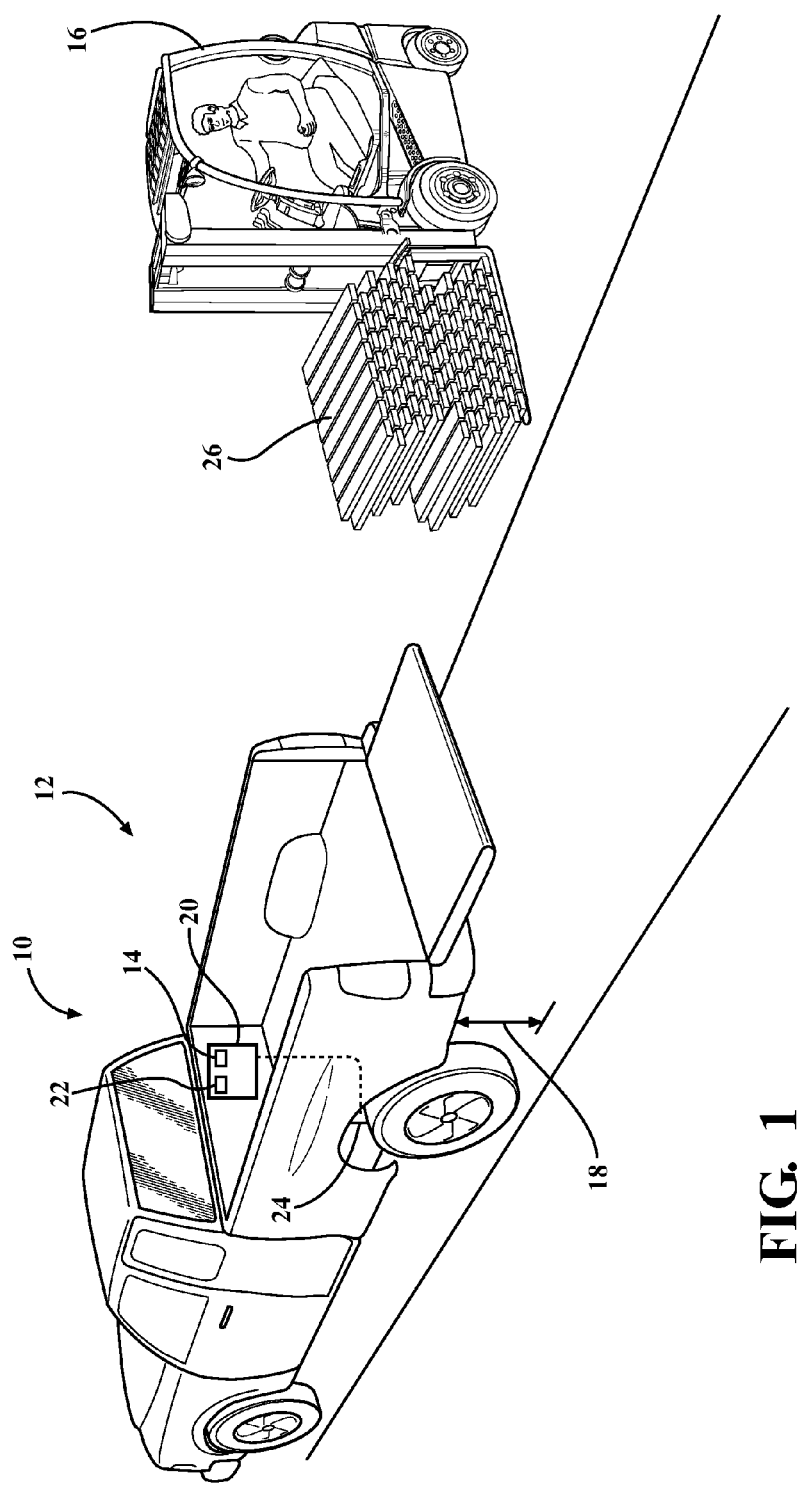
FIG. 1 is a schematic illustration of a vehicle with a suspension system having a forklift detection feature of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 having a pneumatic suspension system 12 including a forklift detection feature 14. The pneumatic suspension system 12 adjusts the height 18 of the vehicle 10 to maintain a targeted height regardless of vehicle load. The forklift detection feature 14 determines if a forklift 16 is present loading or unloading the vehicle 10. The vehicle 10 is a pick-up truck with an adjustable suspension system 12. The adjustable suspension system 12 may be capable of adjusting only the rear axle, the rear and front axle, or all four suspension corners. The response of the pneumatic suspension system 12 is altered to prevent damage to the vehicle 10 and the forklift 16. The pneumatic suspension system 12 may disable or delay vehicle leveling when a forklift 16 is detected to protect the vehicle 10 and the forklift 16.

Figure 2:
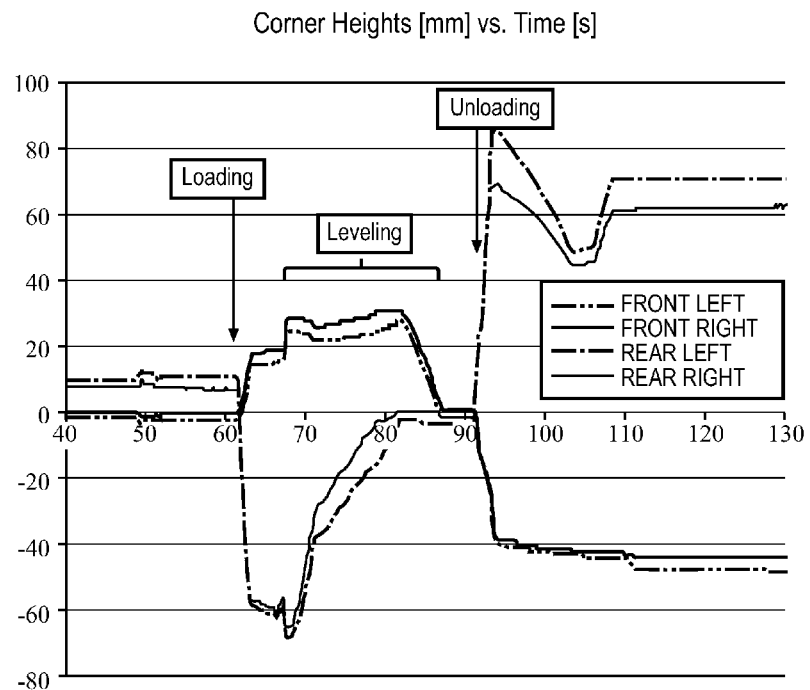
FIG. 2 is a schematic illustration of a method of detecting a forklift for a suspension system of the present invention.

Referring to FIGS. 1 and 2, the suspensions system 12 includes an ECU 20 and at least one sensor 22 for detecting height 18 of the vehicle 10. There may be a sensor 22 located at each corner of the vehicle 10 to detect height 18 of that corner. In the case of a forklift 16 adding load 26 to the vehicle 10 this will result in a quick change in height 18 of the vehicle 10. The change in height will be especially noticeable at a rear axle 24 of the vehicle 10. Throughout the applications the relative directions of forward, rear, left and right are in reference to the direction which an operator for the vehicle 10 would be facing while operating the vehicle 10. By comparing at least two different height measurements collected by the sensor 22 from the rear axle 24 the ECU 20 can determine if a forklift 16 is placing load on the vehicle 10, shown in FIG. 3.

The height 18 from the rear axle 24 is measured using two different low pass filters. T1 is a first low pass filter which measures the height 18 at the rear axle 24 at a first time, e.g. 0.1 sec. T3 is a second low pass filter which measures the height 18 at the rear axle 24 at a second time which is longer than the first time, e.g. 5 sec. When the vehicle 10 is loaded with a forklift 16 the rear axle 24 will lower quickly since the load 26 is applied abruptly. The first filter T1 output will occur immediately while the output of the second filter T3 will be delayed. By comparing the difference in height 18 measured by the first filter T1 and the second filter T3 the ECU 20 can determine if load 26 is being applied, FIG. 3. For example, if the difference in height 18 measured by the first filter T1 and the second filter T3 is greater than a predetermined forklift threshold, e.g. 30 mm of travel which is equivalent to an additional 150 to 200 kg load for one embodiment of a standard one and a half ton pickup truck, then the ECU 20 may determine that a forklift is present and applying load 26 to the vehicle 10. The predetermined forklift threshold for determining forklift 16 presence may be based on the change in height 18 that would result from a selected load size. A predetermined forklift threshold of 30 mm, for example, may be result from a 150-200 kg load being applied to the vehicle 10.

When the ECU 20 detects a forklift 16 is present the suspension system 12 may be put in a "forklift mode". "Forklift mode" may delay or disable the height adjustment of the vehicle 10. Delaying the height adjustment of the vehicle 10 will prevent the vehicle 10 from up-leveling, i.e. adjusting upward, into the forklift 16 and allow time for the forklift 16 to move away from the load 26 and the vehicle 10. The "forklift mode" may only prevent the vehicle 10 from leveling upward and will still allow for downward leveling.

Additionally, to protect the vehicle 10 the suspension system 12 may be limited to entering "forklift mode" only when the vehicle 10 is not moving, i.e. vehicle speed is zero. Also, the suspension system 12 may disable the "forklift mode" when the vehicle 10 is down-leveling, i.e. adjusting downward. Although down-leveling of the vehicle 10 with the suspension system 12 has a different time profile, the extra precaution of disabling "forklift mode" during when the suspension system 12 is in a down-leveling mode will prevent the ECU 20 from determining that the change in height 18 resulting from the down-leveling is actually a forklift 16.

Figure 3:
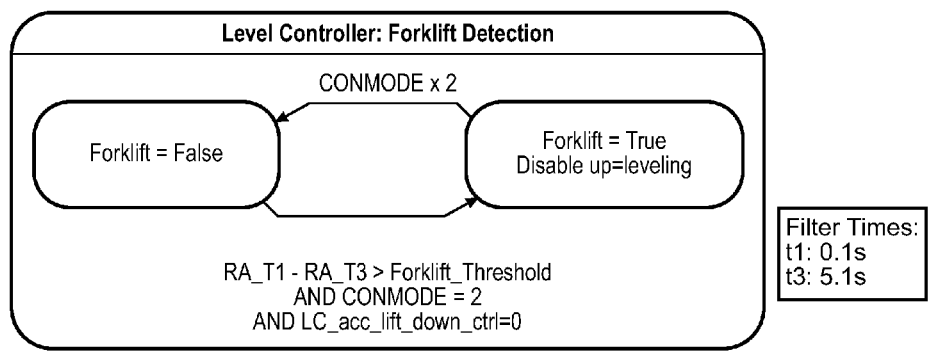
FIG. 3 is a graphic illustration of an embodiment of a response for the suspension system with the forklift detection feature of FIGS. 1 and 2.
Figure 4:
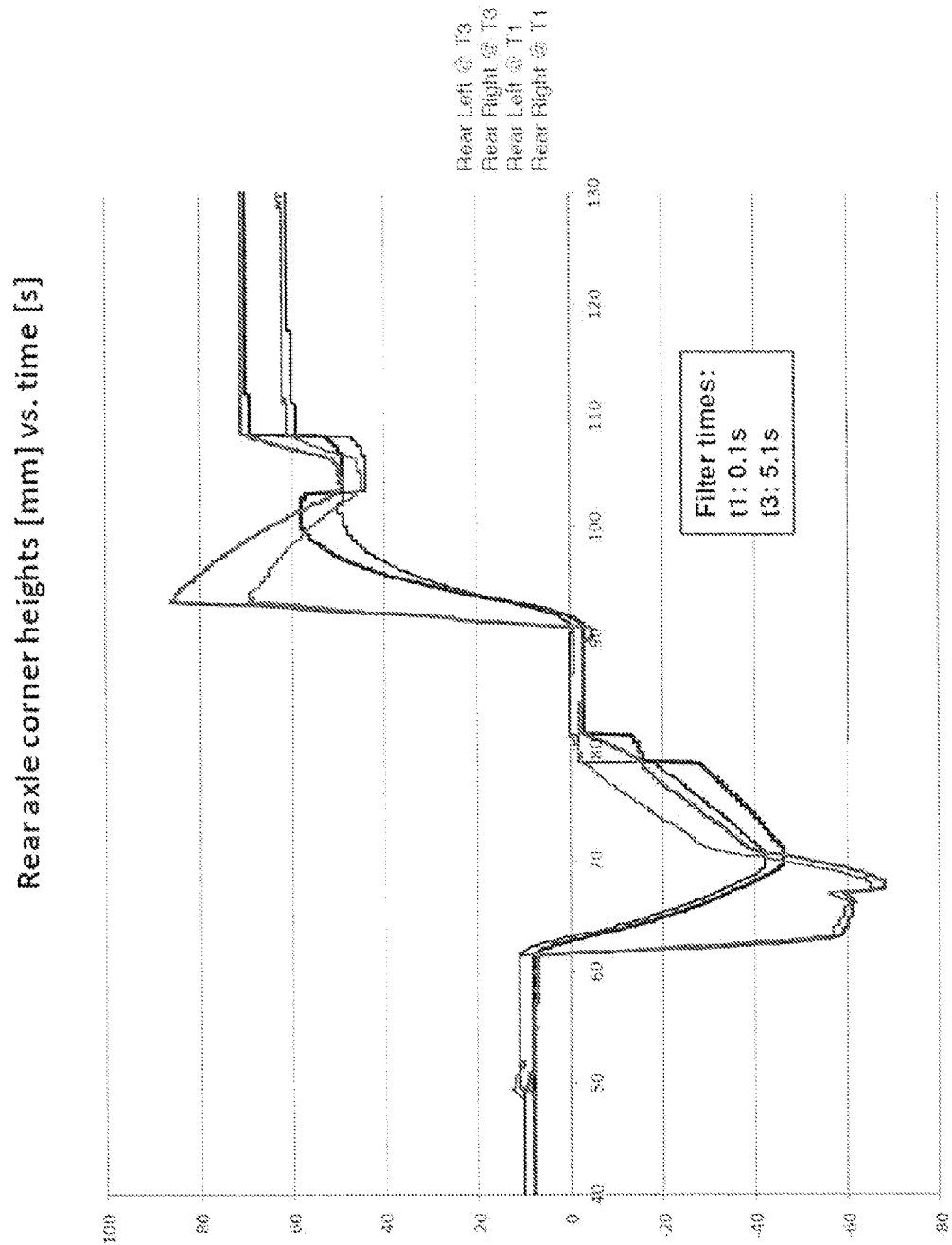
FIG. 4 is a graphic illustration of an embodiment of rear axle heights at times T1 and T3.
Figure 5:
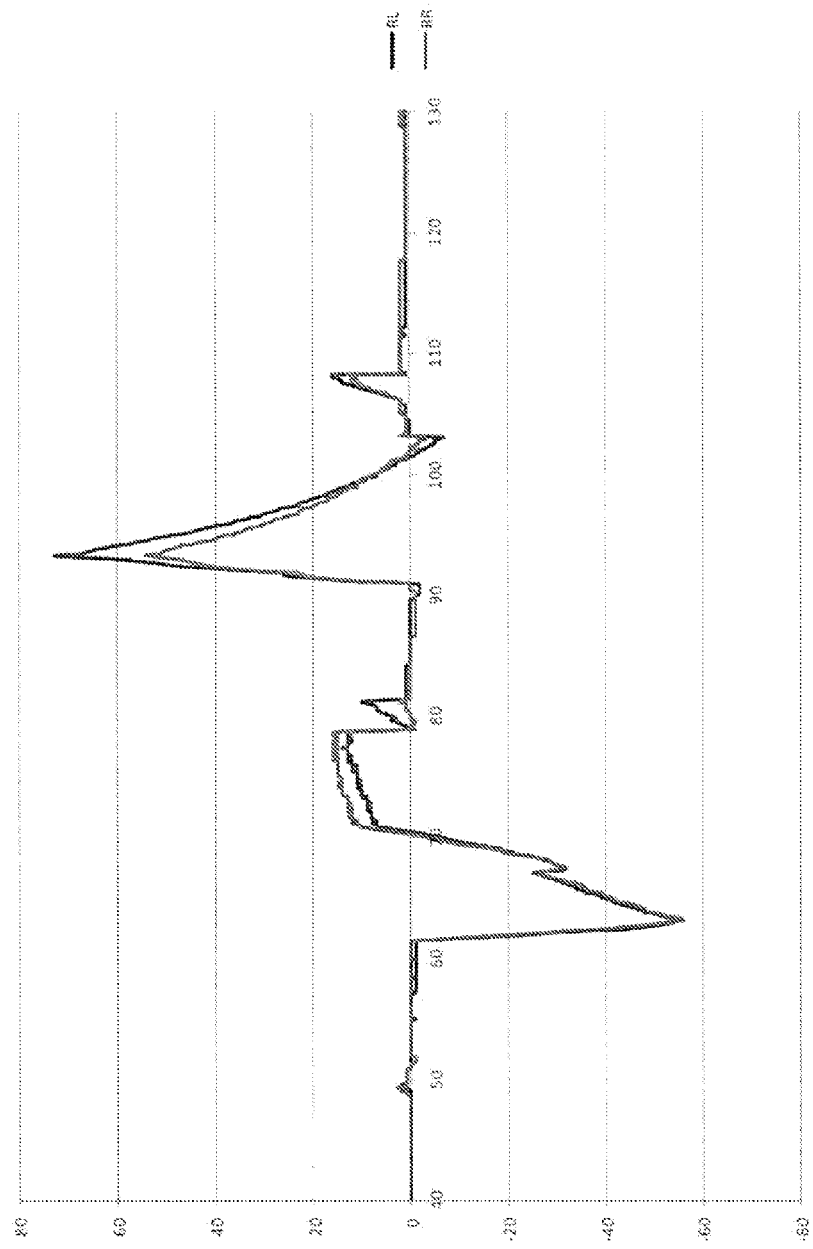
FIG. 5 is a graphic illustration of an embodiment of a comparison in rear axle heights at times T1 and T3.

FIGS. 3-5 illustrates a method of the ECU 20 determining if a forklift 16 is present. FIG. 3 illustrates the reaction of the suspension system 12 when a load 26 is added and removed from the vehicle 10. A height of the rear axle (RA) 24 is calculated with the measurements from the first filter T1 signal based upon a rear left (RL) sensor 22 and a rear right (RR) sensor 22:

$$RA\_T1=(height\_t1(RL)+height\_t1(RR))/2, \text{ where } t1 \text{ is } 0.1 \text{ sec.}$$

FIG. 2 illustrates the rear axle (RA) 24 height at each corner over time, include the first time T1 and the second time T3. A height of the rear axle (RA) 24 is calculated with the measurements from the second filter T3 signal based upon a rear left (RL) sensor 22 and the rear right (RR) sensor 22:

$$RA\_T3=(height\_t3(RL)+height\_t3(RR))/2, \text{ where } t3 \text{ is } 5.1 \text{ sec.}$$

The difference in height between the filters is then compared, illustrated in FIG. 5:

$$RA\_T1-RA\_T3>\text{Forklift Threshold.}$$

The ECU 20 also checks to make sure the vehicle is not moving (CONMODE=2) and that the level control for the suspension system 12 is not in a down level mode (LC_acc_lift_down_crtl=0). If the height difference exceeds the forklift threshold, the vehicle 10 is not moving and not in down-leveling mode the ECU 20 determines that a forklift 16 is present and puts the suspension system 12 in "forklift mode".

Once in "forklift mode" the suspension system 12 will remain there to allow continued loading of the vehicle 10. In one embodiment the vehicle 10 will remain in "forklift mode" until vehicle driving is detected, e.g. vehicle speed is not zero. When movement of the vehicle 10 is detect the suspension system 12 exits "forklift mode" and returns to normal operation to allow suspension 12 adjustment in both directions. The suspension system 12 would adjust height 18 based upon the new load 26 at this time.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a suspension system for a vehicle comprising:
   determining a first filter vehicle height based upon a signal from at least one sensor located at a rear axle of the vehicle at a first time;
   determining a second filter vehicle height based upon a signal from the at least one sensor located at the rear axle of the vehicle at a second time;
   comparing the difference between the first filter signal and the second filter signal to a forklift threshold; and
   placing the suspension system in forklift mode when the difference between the first filter signal and the second filter signal exceeds the forklift threshold.

2. The method of claim 1, further comprising disabling the forklift mode when a vehicle speed is not equal to zero.

3. The method of claim 1, further comprising disabling the forklift mode when the suspension system is in a down level mode.

4. The method of claim 1, wherein determining the first filter vehicle height and the second filter vehicle height further comprises using the signal from a sensor at a rear axle left corner and a rear axle right corner.

5. The method of claim 1, further comprising exiting forklift mode when the vehicle speed is not equal to zero.

6. The method of claim 1, wherein up-leveling of the suspension system is disabled when in the forklift mode.

7. The method of claim 1, wherein the vehicle is a pick-up truck and the suspension system is an adjustable suspension.

8. The method of claim 7, wherein the suspension system is a four corner adjustable suspension system.

9. A suspension system for a vehicle comprising:
   an electronic control unit to control height leveling for the suspension system;
   at least one sensor located at a rear axle of the vehicle to determine vehicle height; and
   wherein the suspension system is in a forklift mode when the electronic control unit determines that a forklift threshold has been exceed based upon a comparison between a first height measurement from the sensor collected at a first time and a second height measurement from the sensor collected at a second time.

10. The suspension system of claim 9, wherein the forklift mode is disabled when a vehicle speed is not equal to zero.

11. The suspension system of claim 9, wherein the forklift mode is disabled when the suspension system is in a down level mode.

12. The suspension system of claim 9, wherein the at least one sensor includes a sensor at a rear axle left corner and a rear axle right corner.

13. The suspension system of claim 9, wherein the vehicle is a pick-up truck and the suspension system is an adjustable suspension.

14. The suspension system of claim 13, wherein the suspension system is a four corner adjustable suspension system.

* * * * *